(12) United States Patent
McLean et al.

(10) Patent No.: US 10,807,586 B2
(45) Date of Patent: Oct. 20, 2020

(54) METHOD AND CONTROL UNIT FOR OPERATING A TRANSMISSION

(71) Applicant: Bayerische Motoren Werke Aktiengesellschaft, Munich (DE)

(72) Inventors: Brian McLean, Toronto (CA); Werner Pfau, Augsburg (DE); Georg Kuss, Munich (DE); Arnd Golle, Munich (DE); Jochen Karl, Wartenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 171 days.

(21) Appl. No.: 16/162,622

(22) Filed: Oct. 17, 2018

(65) Prior Publication Data
US 2019/0047540 A1    Feb. 14, 2019

Related U.S. Application Data

(63) Continuation of application No. PCT/EP2017/058926, filed on Apr. 13, 2017.

(30) Foreign Application Priority Data

Apr. 20, 2016    (DE) .......... 10 2016 206 716

(51) Int. Cl.
*F16H 61/02* (2006.01)
*B60W 10/10* (2012.01)
(Continued)

(52) U.S. Cl.
CPC .......... *B60W 10/10* (2013.01); *B60W 30/184* (2013.01); *B60W 30/19* (2013.01);
(Continued)

(58) Field of Classification Search
CPC ..... B60W 30/184; B60W 30/19; F16H 59/14; F16H 59/52; F16H 2059/142;
(Continued)

(56) References Cited

U.S. PATENT DOCUMENTS 5,489,248 A * 2/1996 Tazawa ................... F16H 61/08
                                                          477/143
5,911,771 A   6/1999 Reichart et al.
(Continued)

FOREIGN PATENT DOCUMENTS

CN    1443288 A    9/2003
CN    102128252 A    7/2011
(Continued)

OTHER PUBLICATIONS

Chinese-language Office Action issued in counterpart Chinese Application No. 201780019806.7 dated Aug. 28, 2019 with English translation (19 pages).
(Continued)

*Primary Examiner* — Edwin A Young
(74) *Attorney, Agent, or Firm* — Crowell & Moring LLP

(57) ABSTRACT

A method for operating a transmission of a vehicle, where the transmission couples a drive machine of the vehicle to a driven wheel of the vehicle and has different rotational speed transmission ratios. The method determines that a special load situation prevails or will prevail at the driven wheel of the vehicle. The method determines a shift time or a shift vehicle position, at which a load on the drive machine is less than or equal to a load threshold value. The method adapts the rotational speed transmission ratio of the transmission for the special load situation at the shift time or at the shift vehicle position.

13 Claims, 2 Drawing Sheets

(51) Int. Cl.
*F16H 59/52* (2006.01)
*F16H 61/04* (2006.01)
*B60W 30/184* (2012.01)
*B60W 30/19* (2012.01)
*F16H 59/14* (2006.01)
*F16H 59/66* (2006.01)

(52) U.S. Cl.
CPC ......... *F16H 59/52* (2013.01); *F16H 61/0213* (2013.01); *F16H 61/04* (2013.01); *F16H 59/14* (2013.01); *F16H 2059/525* (2013.01); *F16H 2059/666* (2013.01); *F16H 2061/023* (2013.01); *F16H 2200/0021* (2013.01); *F16H 2200/0034* (2013.01)

(58) Field of Classification Search
CPC ......... F16H 2059/144; F16H 2059/525; F16H 61/0213; F16H 61/04; F16H 61/0403; F16H 61/08; F16H 2061/023; F16H 2061/0232; F16H 2061/0234; F16H 2306/20
See application file for complete search history.

(56) References Cited

U.S. PATENT DOCUMENTS

| | | |
|---|---|---|
| 2004/0025617 A1 | 2/2004 | Fowler et al. |
| 2009/0048063 A1 | 2/2009 | Silveri et al. |
| 2009/0312146 A1 | 12/2009 | Vesenjak |
| 2010/0048354 A1 | 2/2010 | Leibbrandt et al. |
| 2012/0166051 A1 | 6/2012 | Swartling et al. |
| 2012/0166054 A1 | 6/2012 | Swartling et al. |
| 2013/0289815 A1 | 10/2013 | Suzuki |
| 2015/0039194 A1 | 2/2015 | Tsukizaki |
| 2015/0149052 A1 | 5/2015 | Jeong et al. |
| 2017/0122430 A1* | 5/2017 | Jerger ................. F16H 59/66 |
| 2017/0174220 A1* | 6/2017 | Puri ................. B60W 10/11 |

FOREIGN PATENT DOCUMENTS

| | | |
|---|---|---|
| CN | 102483150 A | 5/2012 |
| CN | 102483153 A | 5/2012 |
| CN | 103298642 A | 9/2013 |
| CN | 104254718 A | 12/2014 |
| CN | 104343950 A | 2/2015 |
| CN | 104670211 A | 6/2015 |
| DE | 10 2005 049 710 A1 | 4/2007 |
| DE | 10 2007 023 069 A1 | 11/2008 |
| DE | 10 2008 044 428 A1 | 2/2009 |
| DE | 10 2010 062 979 A1 | 6/2012 |
| DE | 10 2011 076 816 A1 | 12/2012 |
| DE | 10 2014 215 509 A1 | 2/2016 |
| EP | 0 766 024 A2 | 4/1997 |
| EP | 2 136 106 A2 | 12/2009 |
| EP | 2 527 691 A1 | 11/2012 |
| GB | 2 353 337 B | 12/2003 |
| GB | 2 527 510 A | 12/2015 |

OTHER PUBLICATIONS

International Search Report (PCT/ISA/210) issued in PCT Application No. PCT/EP2017/058926 dated Jul. 7, 2017 with English translation (six (6) pages).

German-language Written Opinion (PCT/ISA/237) issued in PCT Application No. PCT/EP2017/058926 dated Jul. 7, 2017 (seven (7) pages).

German-language Search Report issued in counterpart German Application No. 102016206716.8 dated Feb. 10, 2017 with partial English translation (10 pages).

* cited by examiner

METHOD AND CONTROL UNIT FOR OPERATING A TRANSMISSION

CROSS REFERENCE TO RELATED APPLICATIONS

This application is a continuation of PCT International Application No. PCT/EP2017/058926, filed Apr. 13, 2017, which claims priority under 35 U.S.C. § 119 from German Patent Application No. 10 2016 206 716.8, filed Apr. 20, 2016, the entire disclosures of which are herein expressly incorporated by reference.

BACKGROUND AND SUMMARY OF THE INVENTION

The invention relates to a method and a corresponding control unit for operating a transmission of a vehicle, in particular of an electrically driven vehicle.

Road-going vehicles may have electric machines for drive purposes. Here, electric machines have inter alia the advantage that relatively high torques can be provided over a relatively broad rotational speed range and in particular at low rotational speeds, such that road-going vehicles with electric drive normally do not require transmissions with multiple gear ratios.

On the other hand, operating conditions may exist for which, even in the case of an electrically driven vehicle, a reduction or an increase of a speed ratio between the electric machine and at least one driven wheel of the vehicle is advantageous and/or necessary.

The present document is concerned with the technical problem of providing a method and a corresponding control unit which make it possible for a vehicle, in particular an electrically driven vehicle, to be operated in an efficient and reliable manner even in an extended range of load situations.

According to one aspect, a method for operating a transmission of a vehicle is described. Here, the transmission couples a drive machine of the vehicle to a driven wheel of the vehicle (for example indirectly via an axle to which the driven wheel is fixedly connected). Furthermore, the transmission permits different rotational speed ratios. In particular, the transmission may permit exactly two different rotational speed ratios, a high rotational speed ratio and a low rotational speed ratio, wherein, in the case of the same input rotational speed of an input shaft (also referred to as drive-input shaft) of the transmission, an output rotational speed of an output shaft (also referred to as a drive-output shaft) of the transmission is lower in the case of the high rotational speed ratio than in the case of the low rotational speed ratio. For example, the transmission may be implemented as a standard transmission. It is thus possible to use a relatively lightweight and energy-efficient transmission in order to provide a relatively lightweight and energy-efficient drivetrain for a vehicle, in particular for an electrically driven vehicle. Here, the transmission may be designed without powershift capability. In particular, a change of the rotational speed ratio may require a decoupling between input shaft and output shaft of the transmission, such that torque can no longer be transmitted by the transmission.

The method comprises determining that a special load situation is present or will be present at the driven wheel of the vehicle. For this purpose, it is possible for sensor data from one or more vehicle sensors and/or input data relating to an input by an occupant or user of the vehicle to be evaluated. The special load situation may in this case require a relatively high torque at the driven wheel of the vehicle.

The method furthermore comprises determining a shift time or a shift vehicle position at which a load on the drive machine is lower than or equal to a load threshold value. In particular, a shift time or a shift vehicle position may be determined at which no drive or only little drive of the driven wheel is necessary, or at which no torque or only a low torque has to be transmitted by the transmission to the driven wheel.

Alternatively or in addition, a shift time or a shift vehicle position may be determined at which a deceleration of the vehicle takes place which can be imparted through the use of the drive machine or of one or more friction brakes at one or more wheels of the vehicle. In particular, in a deceleration phase, the mechanical coupling between drive machine and the one or more wheels of the vehicle can be interrupted. The drag or deceleration torque by the drive machine (in particular the recuperation torque in the case of an electric drive machine being used) can, during the shift process, be imparted by the one or more wheel brakes. After the completion of the shift process, the one or more wheels of the vehicle can be coupled to the drive machine again, and thus the drag or deceleration torque can be imparted by the drive machine again. The shift process can thus, in the context of a deceleration phase, be masked, and thus remains imperceptible to an occupant of the vehicle. In particular, during a deceleration phase, by automatic decoupling of the drive machine from the one or more wheels of the vehicle and by means of a corresponding automatic activation of the one or more wheel brakes, it can be achieved that the load on the drive machine is lower than or equal to a load threshold value.

The rotational speed ratio of the transmission can thus be adapted for the special load situation at the shift time or at the shift vehicle position. In particular, an automatic adaptation of the rotational speed ratio of the transmission can be performed without an effect on an occupant of the vehicle. Thus, even in the case of a standard transmission being used, a comfortable change of the rotational speed ratio of the transmission can be performed.

The special load situation may comprise a trailer operating mode of the vehicle and/or a (relatively high) loading state of the vehicle. It is possible for sensor data from a vehicle sensor, in particular a trailer coupling sensor and/or a loading sensor, to be detected. Alternatively or in addition, input data relating to an input by a user at a user interface of the vehicle may be detected. Then, on the basis of the sensor data and/or the input data, it is possible to determine that a special load situation is present.

In the presence of a trailer operating mode and/or a (high) loading state of the vehicle, it is possible already before the start of a journey of the vehicle to determine that a special load situation is present at the driven wheel of the vehicle. The shift time for the adaptation of the rotational speed ratio may then precede the start of the journey of the vehicle, such that a particularly comfortable adaptation of the rotational speed ratio is possible. Here, for the abovementioned special load situations, the rotational speed ratio may be maintained for the entire journey of the vehicle, because the special load situation typically cannot change during the journey of the vehicle. Then, after the end of a journey of the vehicle, it may be determined that a special load situation is no longer present at the driven wheel of the vehicle (for example owing to the decoupling of a trailer and/or owing to an unloading of the vehicle). The rotational speed ratio of the transmission may thereupon be reset after the end of the journey of the vehicle.

In the context of the method, it may be determined that a driving situation which necessitates a change in the rotational speed ratio of the transmission, and which can thus be regarded as a special load situation, will occur ahead. Such a driving situation may be identified in particular on the basis of sensor data from one or more surroundings sensors of the vehicle, on the basis of sensor data from one or more state sensors of the vehicle and/or on the basis of position data from a position sensor of the vehicle.

The method may comprise the detection of position data relating to a position of the vehicle by means of a position sensor (for example a GPS receiver) of the vehicle. Then, on the basis of the position data (typically in conjunction with digital map information and in conjunction with a planned traveling route), it may be determined that a special load situation at the driven wheel of the vehicle will occur. For example, it can be predicted that uphill travel will occur ahead.

Furthermore, the shift time or the shift vehicle position may be determined on the basis of the position data (typically in conjunction with digital map information and in conjunction with a planned traveling route). Here, a traveling speed of the vehicle may possibly also be taken into consideration. The shift time or the shift vehicle position may in this case be determined such that the shift time or the shift vehicle position precede a time or a vehicle position at which the special load situation takes effect. By taking into consideration position data of the vehicle, it is possible even during travel of the vehicle for special load situations to be detected and for the rotational speed ratio of the transmission to be adapted comfortably in a manner dependent on the special load situation.

Alternatively or in addition, the shift time or the shift vehicle position may be determined on the basis of sensor data from one or more surroundings sensors of the vehicle. For example, on the basis of sensor data, a traffic sign may be detected (for example relating to a speed limit lying ahead). Then, on the basis of the sensor data (for example on the basis of the detected traffic sign), the shift time or the shift vehicle position can be determined (for example on the basis of a deceleration phase lying ahead). The consideration of sensor data permits for example a sign identification, a state identification, the determination of road information, a traction state identification of the vehicle, etc.

As already discussed above, the drive machine may comprise an electric motor, such that the operating range of an electric vehicle drive can be expanded in an efficient manner by means of the described method. Alternatively, the drive machine may comprise an internal combustion engine, and the internal combustion engine may additionally be coupled by means of a second transmission (for example by means of a transmission with powershift capability) to the driven wheel of the vehicle. Thus, the operating range for the second transmission can be expanded in an efficient manner by means of the described method.

According to a further aspect, a control unit for a vehicle having a transmission, which couples a drive machine of the vehicle to a driven wheel of the vehicle, is described. Here, the transmission permits different rotational speed ratios. The control unit is designed to determine that a special load situation is present or will be present at the driven wheel of the vehicle. The control unit is furthermore designed to determine a shift time or a shift vehicle position at which a load on the drive machine is lower than or equal to a load threshold value. Furthermore, the control unit is designed to cause the rotational speed ratio of the transmission to be changed for the special load situation at the shift time or at the shift vehicle position.

According to a further aspect, a vehicle (in particular a road-going motor vehicle, for example a passenger motor vehicle, a heavy goods vehicle or a motorcycle) is described which comprises the control unit described in this document.

According to a further aspect, a software (SW) program will be described. The SW program may be configured to be executed on a processor (for example on a control unit of a vehicle) and to thus carry out the method described in this document.

According to a further aspect, a storage medium is described. The storage medium may comprise an SW program which is configured to be executed on a processor and to thus carry out the method described in this document.

It should be noted that the methods, devices and systems described in this document may be used both individually and in combination with other methods, devices and systems described in this document. Furthermore, any aspects of the methods, devices and systems described in this document may be combined with one another in a variety of ways. In particular, the features of the claims may be combined with one another in a variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

As presented in the introduction, the present document is concerned with the efficient operation of a vehicle with electric drive in special load situations, that is to say in particular in situations in which an exceptionally high torque must be imparted to a driven wheel of the vehicle. Examples of special load situations are a trailer operating mode and/or uphill travel of the vehicle.

Figure 1:
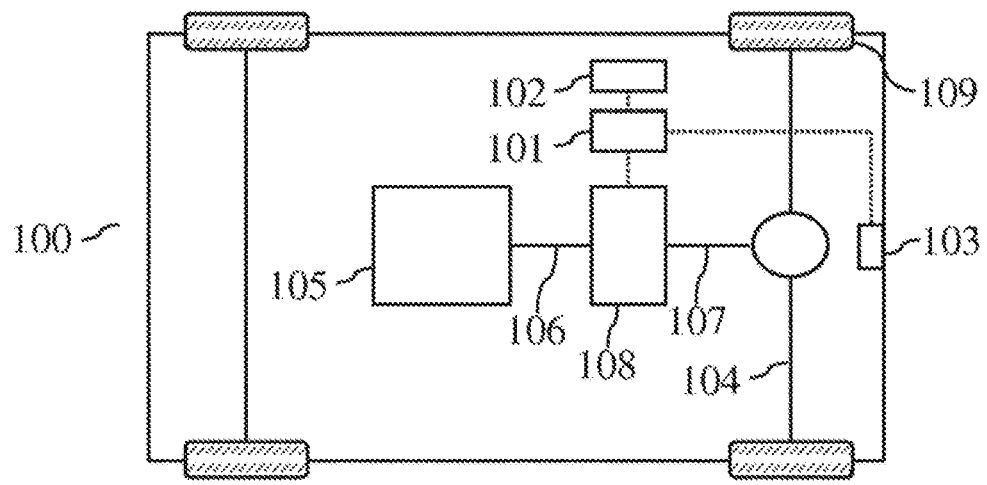
FIG. 1 is a schematic diagram showing exemplary components of an electrically driven vehicle.

FIG. 1 shows exemplary components of a vehicle 100 having an electric drive machine 105 for driving at least one axle 104 (for example a rear axle and/or a front axle) of the vehicle 100, on which axle there are situated one or more wheels 109 of the vehicle 100. The drive machine 105 is mechanically coupled by way of a transmission 108 to the axle 104, wherein a ratio of the rotational speed of the output shaft 107 of the transmission 108 and the rotational speed of the input shaft 106 of the transmission 108 can be varied by the transmission 108. Here, the input shaft 106 is driven by the drive machine 105. Furthermore, the output shaft 107 is driven by the input shaft 106 via the transmission 108, and in turn drives the axle 104 of the vehicle 100 and thus at least one wheel 109 of the vehicle 100.

The transmission 108 has two or more speed ratios or rotational speed ratios. High speed ratios provide a high launch torque, but permit only a relatively low maximum speed. A low speed ratio, by contrast, offers a relatively low launch torque but a higher maximum speed.

In a standard transmission 108, in order to shift the drive machine 105 to a new speed ratio, the force-transmitting path between the drive machine and the wheel 109 or the axle 104 is interrupted for the synchronization and shift process. During this time period, the vehicle 100 has no propulsion, resulting in an interruption in traction power, with an interruption in acceleration, which can be disturbing to an occupant of the vehicle 100.

A transmission 108 with powershift capability utilizes slipping load-transmitting elements to blend the rotational speed adaptation between input shaft 106 and output shaft 107 in the event of a change in the speed ratio and to maintain the propulsion of the vehicle 100. Transmissions 108 with powershift capability are however relatively complex, have a relatively high weight, and often have relatively poor efficiency (in relation to standard transmissions). Therefore, the use of a transmission 108 with powershift capability within an electric drivetrain 105, 108, 104 of a vehicle 100 would typically lead to a reduction in efficiency and range of the vehicle 100.

By automatic relocation of the shift point of a standard transmission 108 into an operating range with little or no demand for propulsion, a noticeable interruption in traction power can be avoided even without the use of a transmission with powershift capability.

The vehicle 100 comprises a control unit 101, by which it is possible to determine that a special load situation which necessitates a change in the speed ratio of the transmission 108 is present or will be present. Furthermore, the control unit 101 may determine a shift time or a shift vehicle position at which the load on the drivetrain 105, 108, 104 of the vehicle 100 is lower than a predefined load threshold value. Furthermore, the control unit 101 may cause the speed ratio of the transmission 108 to be changed for the special load situation at the determined shift time or at the determined shift vehicle position. Thus, the use of a transmission 108 is made possible even for an electric drivetrain. Furthermore, the range of application of a vehicle 100 with electric operation can thus be expanded.

For trips under certain boundary conditions, it is possible already in advance (that is to say before the start of the trip) to determine whether a high or a low speed ratio is required for the entire trip. Accordingly, it is possible already before the start of the trip for the suitable gear ratio to be engaged and to be maintained during the trip. An example of such a situation is the demand for a high speed ratio of the transmission 108 owing to an increased payload of the vehicle 100 and/or owing to a trailer operating mode. Owing to the increased overall load of the vehicle 100, a higher torque will be required here at the one or more driven wheels of the vehicle 100. In particular in the trailer operating mode, it is furthermore normally the case, for stability reasons and/or owing to legal restrictions, that the maximum vehicle speed is limited. A relatively low speed ratio is therefore typically not necessary for the time period of the trailer operating mode.

By means of an automatic detection of the trailer operating mode and/or of an increased payload of the vehicle 100, it is possible for a relatively high speed ratio of the transmission 108 to be set already when the vehicle 100 is at a standstill. The shift process is performed here automatically and without load, and is therefore not perceptible to an occupant of the vehicle 100. The use of a transmission with powershift capability is not necessary.

Upon the decoupling of the trailer and/or upon the unloading of the vehicle 100, the vehicle 100 is at a standstill, and it is thus possible to automatically set a relatively low speed ratio of the transmission 108 in the load-free state.

The start and the end of the trailer operating mode may be detected by use of a trailer coupling sensor 103. The loading and unloading of the vehicle 100 may be detected by use of a weight sensor. Alternatively or in addition to an automatic identification of the start and/or the end of the trailer operating mode, the vehicle 100 may have a user interface (for example a selector switch) which makes it possible for an occupant of the vehicle 100 to activate or deactivate the trailer operating mode of the vehicle 100. By means of a particular setting of the user interface, it is for example also possible for a bicycle carrier mounted on the trailer coupling to be identified, and it is possible to prevent a high speed ratio of the transmission 108 being erroneously selected in such a situation.

Figure 3:
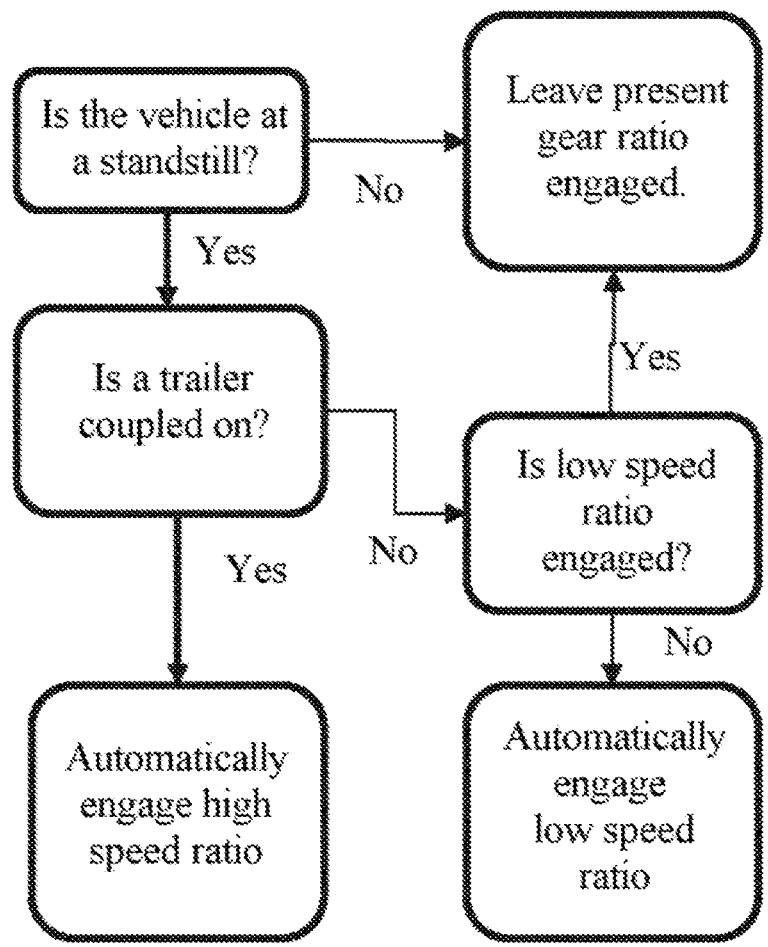
FIG. 3 is an exemplary decision diagram for a transmission of a drivetrain of a vehicle.

FIG. 3 shows an exemplary decision diagram for the setting of a speed ratio of the transmission 108. The control unit 101 may detect whether or not the vehicle 100 is at a standstill. If the vehicle 100 is not at a standstill, the present speed ratio may be maintained. On the other hand, for a stationary vehicle 100, it may be checked whether or not a trailer is coupled to the vehicle 100. If it is detected that a trailer is coupled, a relatively high speed ratio of the transmission 108 can be set or maintained. On the other hand, a relatively low speed ratio may be set or maintained.

The transmission 108 may, owing to the use with an electric drive machine 105, have a relatively small number of different speed ratios (for example two, that is to say one high and one low speed ratio). Through the use of a small number of rotational speed ratios, the weight of the transmission 108 can be further reduced.

It may possibly be necessary or expedient for the speed ratio of the transmission 108 to be changed during travel. Here, a shift process should be performed at a time which is such that a disturbing influence owing to an interruption in traction power is minimized or avoided entirely.

On the basis of position data (e.g. GPS data from a GPS sensor 102) and on the basis of a planned traveling route, points of inflection in the vehicle longitudinal acceleration can be predicted. At such points of inflection, the speed ratio of the transmission 108 can be varied without an occupant of the vehicle 100 noticing an interruption in the acceleration.

The speed ratio to be set for the upcoming routes may be predicted on the basis of information relating to the present vehicle position and vehicle speed, possible speed limits, gradients and/or curves of the upcoming vehicle route, a vehicle state and/or a vehicle loading, a selected drive mode and/or a driving style.

Furthermore, a position on the traveling route at which a low acceleration or an acceleration inflection point is present may be predicted. At this position, a standard transmission 108 can change the gear ratio without an occupant of the vehicle 100 noticing an unpleasant interruption in the power flow. The comfort for an occupant of the vehicle 100 can thus be improved without the need to use a transmission with powershift capability.

The method described in this document for operating a standard transmission may possibly be used in addition to a CVT (Constant Velocity Transmission) or in addition to a transmission with powershift capability, in order to expand the operating range for such transmissions in an efficient manner.

Figure 2:
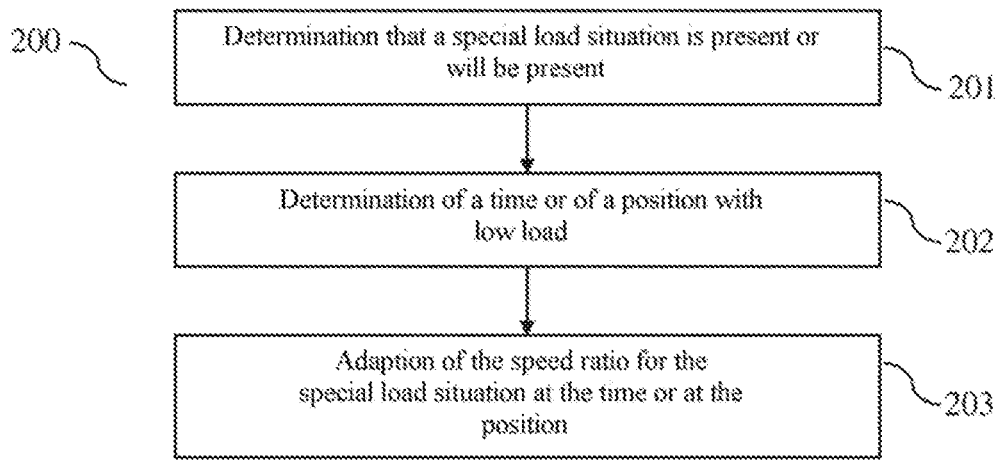
FIG. 2 is a flow diagram of an exemplary method for operating a drivetrain of a vehicle.

FIG. 2 shows a flow diagram of an exemplary method 200 for controlling a transmission 108 of a vehicle 100. The transmission 108 mechanically couples a drive machine 105 of the vehicle 100 to (at least) one driven wheel 109 of the vehicle 100. Here, the transmission 108 has different rotational speed ratios. The transmission 108 is in particular a standard transmission, in the case of which the rotational speed ratio between input shaft 106 and output shaft 107 is realized by complete decoupling of the two shafts 106, 107.

The method 200 comprises the determination 201 that a special load situation is present or will be present at the driven wheel 109 of the vehicle 100. The special load situation may in this case be such that the special load situation requires a relatively high torque at the driven wheel 109 of the vehicle 100 in order to drive the vehicle 100. A special load situation may be caused for example by a trailer operating mode, by a relatively high loading state and/or by uphill travel.

The method 200 furthermore comprises the determination 202 of a shift time or of a shift vehicle position at which a load on the drive machine 105 is lower than or equal to a low threshold value. The load threshold value may in this case be selected such that a decoupling, caused by a shift process, between drive machine 105 and driven wheel 109 is below a threshold of perception of an occupant of the vehicle 100. Furthermore, the method 200 comprises the adaptation 203 of the rotational speed ratio of the transmission 108 for the special load situation at the shift time or at the shift vehicle position.

By means of the method 200, it is made possible that, even with the use of an energy-efficient and lightweight standard transmission, an adaptation of the rotational speed ratio of the transmission 108 can be performed in a comfortable manner. This in turn permits an expansion of the range of use of electric drive machines in a vehicle 100.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a transmission of a vehicle equipped with a drive machine coupled to a driven wheel via the transmission, wherein the transmission has different rotational speed ratios; the method comprising the acts of:
   determining that a special load situation is present or will be present at the driven wheel of the vehicle;
   determining a shift time or a shift vehicle position at which a load on the drive machine is lower than or equal to a load threshold value; and
   adapting the rotational speed ratio of the transmission for the special load situation at the shift time or at the shift vehicle position.

2. The method as claimed in claim 1, wherein the special load situation comprises one or both of:
   a trailer operating mode of the vehicle, and
   a loading state of the vehicle.

3. The method as claimed in claim 2, further comprising the act of:
   before a start of a trip of the vehicle, determining that the special load situation is present at the driven wheel of the vehicle,
   wherein the shift time lies before the start of the trip of the vehicle.

4. The method as claimed in claim 3, further comprising the act of:
   determining, after the end of the trip of the vehicle, that the special load situation is no longer present at the driven wheel of the vehicle; and
   thereupon resetting the rotational speed ratio of the transmission after the end of the trip of the vehicle.

5. The method as claimed in claim 2, wherein the method comprises detecting one or more of:
   sensor data from a vehicle sensor, and
   input data relating to an input by a user at a user interface of the vehicle, and
   based on the sensor data and/or the input data, determining that the special load situation is present.

6. The method as claimed in claim 5, wherein
   the sensor data is from one or both of a trailer coupling sensor and a loading sensor.

7. The method as claimed in claim 1, further comprising the acts of:
   detecting position data relating to a position of the vehicle by way of a position sensor of the vehicle;
   on the basis of the position data, determining that the special load situation is present at the driven wheel of the vehicle; and
   determining the shift time or the shift vehicle position on the basis of the position data.

8. The method as claimed in claim 7, wherein the shift time or the shift vehicle position:
   (i) are determined on the basis of digital map information, on the basis of sensor data, and/or on the basis of a vehicle speed of the vehicle; and/or
   (ii) are determined such that the shift time or the shift vehicle position precedes a time or a vehicle position at which the special load situation takes effect.

9. The method as claimed in claim 1, wherein
   the drive machine comprises an electric motor; or
   the drive machine comprises an internal combustion engine, and the internal combustion engine is coupled by way of a second transmission to the driven wheel of the vehicle.

10. The method as claimed in claim 1, wherein the transmission:
    has exactly two different rotational speed ratios in the form of a high rotational speed ratio and a low rotational speed ratio, wherein, in the case of the same input rotational speed of an input shaft of the transmission, an output rotational speed of an output shaft of the transmission is lower in the case of the high rotational speed ratio than in the case of the low rotational speed ratio.

11. The method as claimed in claim 10, wherein
    the transmission comprises a standard transmission or a variable speed transmission.

12. The method as claimed in claim 1, wherein
    the transmission comprises a standard transmission or a variable speed transmission.

13. An apparatus for a vehicle having a transmission which couples a drive machine of the vehicle to a driven wheel of the vehicle, the transmission permitting different rotational speed ratios, comprising:
    a control unit operatively configured to execute a control to:
    determine that a special load situation is present or will be present at the driven wheel of the vehicle;
    determine a shift time or a shift vehicle position at which a load on the drive machine is lower than or equal to a load threshold value; and cause the rotational speed ratio of the transmission to be changed for the special load situation at the shift time or at the shift vehicle position.

\* \* \* \* \*